United States Patent [19]
Suzuki et al.

[11] 3,925,598
[45] Dec. 9, 1975

[54] ARMORED SUBMARINE CABLE HAVING LENGTHWISE DISTRIBUTED INSULATION MEANS IN EACH ARMOR WIRE

[75] Inventors: Kinya Suzuki, Tokyo; Tokio Izumi, Yokohama, both of Japan

[73] Assignees: Nippon Telegraph & Telephone Public Corporation; Ocean Cable Co., Ltd., both of Tokyo, Japan

[22] Filed: Dec. 30, 1974

[21] Appl. No.: 537,140

[30] Foreign Application Priority Data
Jan. 10, 1974 Japan.................................. 49-6260

[52] U.S. Cl................ 174/108; 174/84 R; 174/88 R
[51] Int. Cl.² .......................................... H02G 15/08
[58] Field of Search............ 174/85, 84 R, 107, 108, 174/70 S, 88 R; 307/95

[56] References Cited
UNITED STATES PATENTS
1,762,956   6/1930   Buckley............................ 174/85 X
2,256,897   9/1941   Davidson et al...................... 174/85
3,105,870   10/1963   Raila et al............................. 174/85

FOREIGN PATENTS OR APPLICATIONS
769,886   3/1957   United Kingdom................... 174/85

*Primary Examiner*—Darrell L. Clay
*Attorney, Agent, or Firm*—Flynn & Frishauf

[57] ABSTRACT

An armored submarine cable includes a cable core and a plurality of armor wires extending substantially longitudinally of the cable around the core and spaced apart from the core. Each of the armor wires comprises a plurality of lengthwise successively aligned sections of anticorrosive metal wires and an electric insulation means between each adjacent two of the sections of metal wires. The electric insulation means are spaced from each other and are distributed longitudinally of the cable.

13 Claims, 8 Drawing Figures

ARMORED SUBMARINE CABLE HAVING LENGTHWISE DISTRIBUTED INSULATION MEANS IN EACH ARMOR WIRE

BACKGROUND OF THE INVENTION

This invention relates to an armored submarine cable.

A submarine cable comprises a core of one or more conductors. In general, the core is covered and protected by layers of jute and armor. The armor comprises a plurality of armor wires on a bedding layer of jute surrounding the core and is, in turn, covered by an outer jute layer. All jute and armor applications are flooded with asphaltum tar impregnation. Mild-steel wires are used as the armor wires in cables for use in intermediate depths. In deeper water cables, high-tensile steel wires are needed to withstand the strain of handling at great depths. The armor wires are coated with tar or some other electrically insulating material. For example, a steel wire, from 6.0 to 8.0 mm in diameter, is covered by a 0.3 mm thick layer of polyvinyl chloride. Alternatively, use is made of neoprene as the coating insulator. Despite the tar impregnation, the sea water eventually comes into contact with the armor. The coating insulator nevertheless protects the armor wires against corrosion by the sea water in theory.

Wear and damage of an armored submarine cable generally occurs at the armor and proceeds to the core. Basically, the armor wires are worn and damaged both mechanically and electrochemically. Kinya Suzuki, one of the present joint inventors, discovered jointly with another the fact that a d.c. electric current resulting from an electromotive force generated by the tidal current flowing across the vertical component of the terrestrial magnetism flowed into the metal armor wires and that the electrochemical wear and damage occurred at a point where the d.c. current flowed out of the armor wire. They published the theory and the results of experiments in a Japanese technical monthly, "Denki Gakkai Zassi" (Journal of The Institute of Electrical Engineers of Japan), June, 1956 issue.

At both ends, a submarine cable is connected to terminal installations located on the ground. A stray electric current therefore results not only from the tidal current but also from underground electric currents. As described, the armor wires are insulated from the sea water by the insulating material. Each wire therefore would have no points where the stray current can flow thereinto and out thereof. It is, however, not seldom that the insulation is damaged during the time a submarine cable is in use. More particularly, some portions of the submarine cable may lie near submarine rocks. At these portions, the tidal current repeatedly brings the cable into contact with the rocks to eventually damage the insulation for one or more armor wires. Under the circumstances, the stray current seriously damages the armor wires in a relatively short period of time, such as 1 year.

SUMMARY OF THE INVENTION

It is therefore an object of the present invention to provide an armored submarine cable having a long serviceable life.

As described hereinabove, an armored submarine cable includes a cable core centrally of the cable and a plurality of armor wires extending substantially longitudinally of the cable around the core and spaced apart therefrom. In accordance with this invention, each of the armor wires comprises a plurality of lengthwise successively aligned sections of anticorrosive metal wires and an electric insulation means between each adjacent two of said sections of the metal wires. Consequently, an armored submarine cable according to this invention has lengthwise distributed spaced electric insulation means in each of its armor wires. Preferably, the electric insulation means are scattered or distributed along the length of the cable.

DESCRIPTION OF THE PREFERRED EMBODIMENTS

Figure 1:
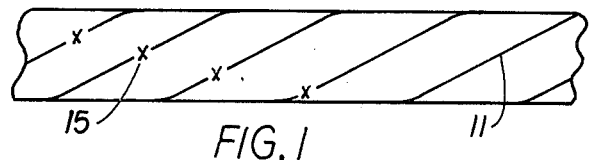
FIG. 1 schematically shows a side view of an armored submarine cable according to the instant invention, with an outer layer or layers of the cable removed.

Referring to FIG. 1, an armored submarine cable comprises a cable core (not shown) centrally of the cable, a plurality of armor wires 11, and a bedding layer (not shown) of jute or a similar material concentrically around the core. One or more outer layers (not shown) cover the armor wires 11. The cable may comprise other layers, such as one or more copper tape layers, between the core and the bedding layer. In general, from seven to scores of armor wires 11 are extended on the bedding layer substantially longitudinally of the cable with a left-hand directed slight lay angle. Although depicted or spaced in discrete circumferential positions, the armor wires 11 are in contact with one another in practice.

Figure 2:
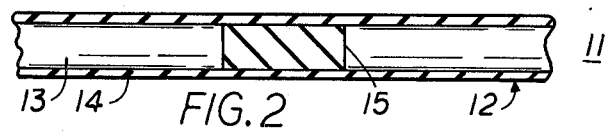
FIG. 2 is an enlarged schematic axial sectional view of one of armor the wires of the cable.

Referring also to FIG. 2, each of the armor wires 11 of a submarine cable according to the instant invention comprises a plurality of lengthwise seccessively aligned anticorrosive metal wires 12. Each of the metal wires 12 comprises, in turn, a metal wire 13, such as a steel wire, and a coating 14 of an electrically insulating material. The coating 14 serves to render the underlying metal wire 13 anticorrosive. An electric insulation means 15 is disposed between the ends of two adjacent anticorrosive metal wires 12 aligned along each of the armor wires 11. Each underlying metal wire 13 is generally from about 100 to 600 meters long and, more preferably, from about 300 to 600 meters long as will later become clear. The electric insulation means 15 are distributed longitudinally of the cable as best shown in FIG. 1. The distance between two adjacent electric insulation means 15 is preferably about 2 meters or more. The underlying metal wires 13 may be galvanized steel wires.

Figure 3:
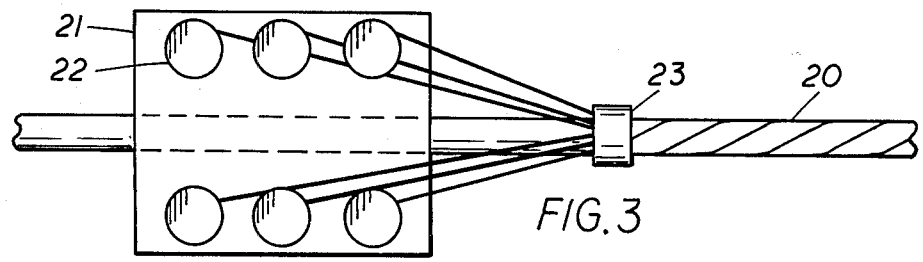
FIG. 3 is a schematic view of an arrangement for applying armor wires of a submarine cable with a given lay angle.

Referring to FIG. 3, an arrangement for laying a predetermined number of armor wires 11 on a bedding layer of a submarine cable 20 being manufactured comprises a frame 21 having a central bore (not shown) for the cable 20 and carrying a plurality of bobbins 22 for the armor wires 11. Together with a die 23 for the armor wires 11, the frame 21 is controllably movable relative to and longitudinally of the cable 20. The frame 21 is also controllably rotatable about the axis of the cable 20. Each piece or element of an armor wire 11 as manufactured is generally shorter than a submarine cable. It is therefore usual that an armor wire 11 has a plurality of points spaced weld between the armor wire pieces at a pitch ranging from 300 to 600 meters. In implementing the present invention, the electric insulation means 15 are preferably situated at such points of connection and replace such weld points. More particularly, the armor wire pieces may be joined to one another according to a first mode of laying armor wires, with the electric insulation means 15 interposed therebetween. Thereafter or meanwhile, a long armor wire 11 having lengthwise distributed electric insulation means 15 may be wound around a bobbin 22. Alternatively, one end of an electric insulation means 15 may be fixed, according to a second mode of armor wire laying, to a trailing end of an armor wire piece paid out of a bobbin 22 when the end has reached a point between the bobbin 22 and the die 23 rendering the bobbin 22 empty. In the meantime, a new bobbin 22 full of an armor wire piece is substituted for the empty bobbin 22 and a leading end of the armor wire piece supplied from the new bobbin 22 is brought into contact with the other end of the electric insulation means 15 and fixed thereto. It is now possible to restart laying the armor wires 11 on the bedding layer.

It is to be noted here that an armored submarine cable according to this invention is substantially devoid of adverse effects due to wear and damage unless the coating 14 of an armor wire 11 is broken at two or more points between two adjacent electric insulation means 15 of an armor wire 11. In addition, it has been found that the stray electric current becomes weaker so as to be less harmful to the underlying metal wire 13 when the distance between those points is shorter at which the stray current flows into the underlying metal wire 13 and flows out thereof. Therefore, the distance between the adjacent electric insulation means 15 of each armor wire 11 should in theory be made as short as possible, as by providing a few electric insulation means 15 within a single armor wire piece. In practice, the electric insulataion means 15 may be disposed, in view of the productivity of submarine cables, at each point of connection of an armor wire piece to another except for those portions of a submarine cable which are to be laid adjacent to closely spaced submarine rocks.

Figure 4:
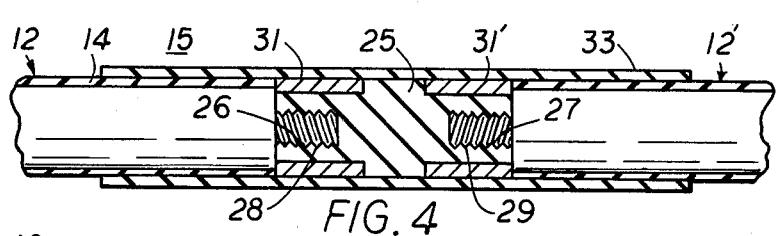
FIG. 4 is a schematic axial sectional view of an electric insulation means between two adjacently aligned metal wires of an armor wire of a submarine cable according to a first aspect of this invention.

Referring to FIG. 4, an electric insulation means 15 provided according to a first aspect of this invention between two adjacently aligned anticorrosive metal wires 12 and 12' comprises a cylindrical electrical insulator piece or member 25 having axial bores 26 and 27 at the cylinder ends which are tapped with oppositely directed screw threads. The insulator member 25 may be made of synthetic resin or plastics, such as polyethylene terephthalate nylon and Bakelite. The adjacent ends of the metal wires 12 and 12' are of a smaller diameter and threaded at 28 and 29 so as engage or mesh with the tapped bores 26 and 27, respectively. The insulator member 25 is accompanied by a pair of metal rings or tubes 31 and 31' concentrically mounted around the portions having the tapped bores 26 and 27. After a pair of threaded ends 28 and 29 of two anticorrosive metal wires 12 and 12' are placed in alignment with each other with a space for snugly receiving an insulator member 25 left between their end faces, the insulator member 25 having the metal tubes 31 and 31' mounted thereon is put between the end faces and then turned to unite the anticorrosive metal wires 12 and 12'. Thereafter, the metal tubes 31 and 31' may be squeezed or crimped to tighten the joints between the insulator member 25 and the metal wires 12 and 12'. Alternatively or in addition, the threaded ends 28 and 29 may be brought into engagement with the tapped bores 26 and 27 and fixed thereto by the use of a cementing material. The insulator member peripheral surface and the metal tube outer surfaces are now coated by a layer 33 of an electrically insulating material, which preferably is the same as the material of the anticorrosive metal wire coatings, such as coating 14, to facilitate formation of an integral coating throughout the armor wire 11.

It was possible with an armor wire 11 having the electric insulation means 15 according to the first aspect of the invention to attain a tensile strength sufficiently high for use in place of a conventional merely welded armor wire of the same diameter. On the other hand, these electric insulation means 15 render it impossible to lay the armor wires 11 on the bedding layer in accordance with the first mode of armor wire laying described above. Productivity of submarine cables, however, is not materially adversely affected thereby because it is possible to complete provision of each electric insulation means 15 according to the first aspect of the invention within a relatively short period of time.

Figure 5:
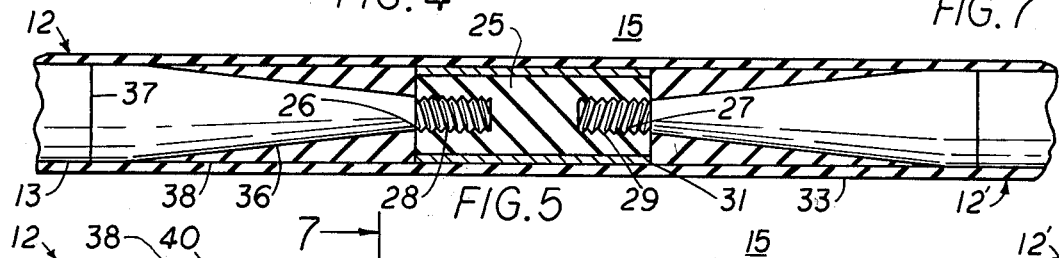
FIG. 5 is a similar view of an electric insulation means of the type according to a second aspect of this invention.

Referring to FIG. 5, an electric insulation means 15 according to a second aspect of this invention comprises a cylindrical electrical insulator member 25 having oppositely threaded axial bores 26 and 27, smaller-diameter threaded ends 28 and 29 of two adjacent anticorrosive metal wires 12 and 12', and a single metal tube 31 for reinforcing the engagement of the threaded ends 28 and 29 with the tapped bores 26 and 27. Besides the threaded end, such as 28, each underlying metal wire 13 has a tapered portion 36 ending at the threaded end 28. The tapered portion 36 may be separately manufactured and thereafter welded to the underlying metal wire 31 at a weld point 37. In any event, it is possible to say that each anticorrosive metal wire 13 has at least one machined end which becomes an element of an electric insulation means 15. After a pair of machined ends of two anticorrosive metal wires 12 and 12' are joined together by an insulator member 25, the voids formed around the tapered portions, such as 36, and bounded by the insulator member end faces are filled with masses 38 of a resilient electrically insulating material, such as a soft polyvinyl resin. Thereafter, a layer 33 of an electrically insulating material is placed on the outer surfaces of the metal tube 31 and the resilient insulating material masses 38.

With armor wires 11 having the electric insulation means 15 according to the second aspect of the invention, it is possible to resort to the first mode of armor wire laying and raise the productivity of submarine cables. For example, an armor wire 11 having underlying steel wires, 8 mm in diameter, and electric insulations of the type being described, each comprising a pair of tapered portions, each 225 mm long, a pair of threaded ends, 4.5 mm in diameter, and a nylon insulator member, 30 mm long, had a total tensile strength of 225 kg, was successfully wound with a total tension of 70 kg around a bobbin or mandrel, 270 mm in diameter, and was again straightened out of the mandrel without adverse effects with a total tension of 100 kg.

Figure 7:
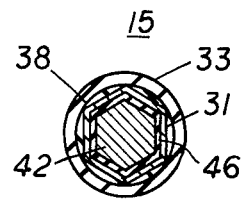
FIG. 7 is a cross-sectional view taken on a plane shown in FIG. 6 by a line 7—7.
Figure 6:
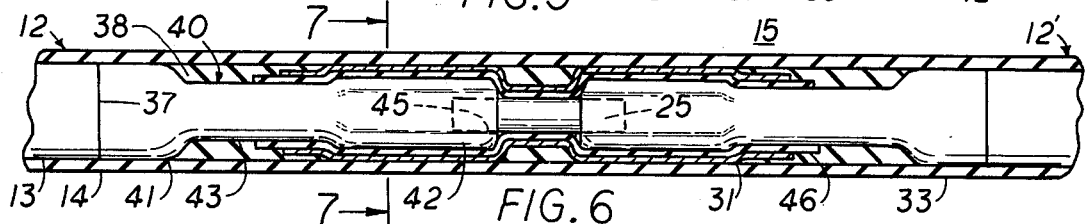
FIG. 6 is a similar view of an electric insulation mean of the type according to a third aspect of this invention.

Referring to FIGS. 6 and 7, an electric insulation means 15 according to a third aspect of this invention comprises an insulator member 25 and a pair of short metal wires 40. A first portion 41 of the short metal wire 40 which is to be welded to an underlying metal wire 13 at a weld point 37 has a diameter equal to or smaller than the diameter of the underlying metal wires 13. A second portion 42 of the short metal wire 40 has a polygonal cross section whose maximum diameter is smaller than that of the underlying metal wires 13. A third portion 43 of a smaller diameter connects the first and second portions 41 and 42. Each end of an insulator member 25 may have a diameter smaller than the minimum diameter of the second portions 42 of short metal wire 40 so as to be driven into those central bores 45 of the second portions 42 which are reamed out. Alternatively, the insulator member 25 may have a pair of oppositely threaded machine screw threads (not shown) embedded therein to serve as a turnbuckle for engaging with tapped central bores 45 of the second portions 42. A thin tube 46 of an electrically insulating material, such as polyvinyl, neoprene, and polytetrafluoroethylene (known by a trade name Teflon), covers the insulator member 25 and the second portions 42 and extends around the third portions 43. Instead of the insulator tube 46, use may be made of a layer 46 of a heat resistant resin reinforced by glass or other fibers. A tube 31 of a metal, such as stainless steel, is put on the insulator tube 46. The second and third portions 42 and 43 of wire 40 may preliminarily be coated with an inorganic oxide to augment the electric insulation between the metal tube 31 and the short metal wires 40. The inner surface of the metal tube 31 may be subjected to insulation treatment. An assembly comprising the insulator member 25, short metal wires 40, insulator tube 46, and metal tube 31 is pressed or crimped at the position of the metal tube 31 into the shape depicted in FIGS. 6 and 7. The assembly is now subjected to injection molding to fill the voids formed around portions of the metal tube 31 and around the third portions 43 of wires 40 with masses 38 of a resilient electrically insulating material and thereafter coated by a layer (not shown) of an electrically insulating material, which preferably is the same as the anticorrosive metal wire coatings 14. After the short metal wires 40 are welded to two adjacent underlying metal wire ends, a layer 33 of an electrically insulating material is put on the whole outer surface of the electric insulation means 15 so that it becomes generally integral with the anticorrosive metal wire coatings 14.

Besides having sufficient tensile strength and bendability, an electric insulation means 15 according to the third aspect of the invention has a sufficient torsion resistance to withstand the torsion to which an armor wire 11 is subjected during manufacture of submarine cables, laying thereof, and use thereof in sea. The electric insulation between two adjacent underlying metal wires, such as 13, has a resistance of about 2 megohms or more when tested by the use of an electric voltage of several volts.

Figure 8:
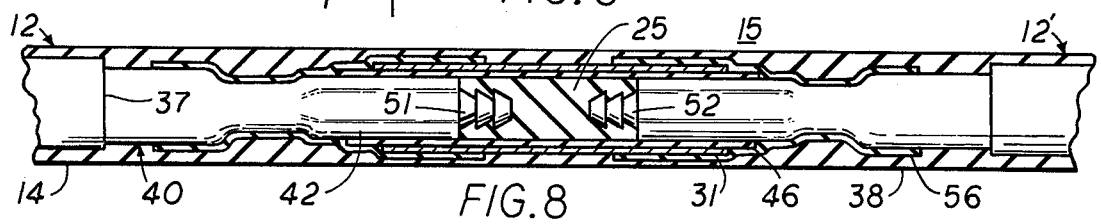
FIG. 8 is a schematic axial sectional view of an electric insulation means between two adjacently aligned metal wires of an armor wire of a submarine cable according to a fourth aspect of this invention.

Referring finally to FIG. 8, an electric insulation means 15 according to a fourth aspect of this invention is similar to that illustrated with reference to FIGS. 6 and 7. Here, machine screws 51 and 52 are shown, embedded in the insulator member 25. The insulator tube 46 only partly covers the short metal wire second portions 42. A second thin tube 56 of an electrically insulating material, such as polyurethane, covers the metal tube 31 and the first insulator tube 46 and extends around the first short metal wire portions 41. The masses 38 of a resilient electrically insulating material, such as polyvinyl chloride, are formed integral with the anticorrosive metal wire coatings 14 as an integral part of the insulator member overcoating 33 after the short metal wires 40 are welded to two adjacent underlying metal wire ends.

With an armor wire 11 comprising underlying steel wires, 8.0 mm in diameter, anticorrosive metal wire coatings, 0.3 mm thick, and electric insulation means 15 according to the fourth aspect of the invention, each about 70 cm long and comprising, in turn, an insulator member, 6.0 mm in diameter and 40 mm long, machine screws, 3 mm in diameter and each having a 8 mm long threaded portion and a 10 mm long embedded portion, first short metal wire portions, 7.0 mm in diameter and each 200 mm long, second portions, 6.0 mm in maximum diameter and each 25 mm long, third portions, 5.5 mm in diameter and each 100 mm long, a stainless steel tube having an outer diameter of 8.0 mm and an inner diameter of 7.0 mm before being squeezed or crimped to the second portions, a second insulator tube, about 40 cm long, and an insulator member coating, 8.6 mm in outside diameter, it was possible to attain a total tensile strength of 700 kg where a total strength of 200 kg is sufficient for manufacture of submarine cables. It was possible to twist the armor wire 180° per meter without adverse effects. The armor wire was three times wound around a mandrel, 300 mm in diameter, and straightened therefrom with an excellent bendability, where the diameter of the bobbins 22 described with reference to FIG. 3 is about 400 mm or more in practice.

While armored submarine cables according to this invention and, particularly, electric insulation means 15 therefor have thus far been described in conjunction with several preferred aspects of this invention, it will now be clear that a tapered portion 36 of an underlying metal wire 13 may be substituted for the smaller-diameter third short metal wire portion 43 and vice versa. Use may be made both of a tapered portion and a small-diameter third portion. The insulator member 25 illustrated with reference to FIGS. 6 and 7 may have smaller-diameter ends.

What is claimed is:

1. In an armored submarine cable including a cable core centrally of said cable and a plurality of armor wires extending substantially longitudinally of said cable around said core and spaced apart therefrom, the improvement wherein each of said armor wires comprises a plurality of lengthwise successively aligned sections of anticorrosive metal wires and an electric insulation means between each adjacent two of said sections of said anticorrosive metal wires.

2. An armored submarine cable as claimed in claim 1, wherein said electric insulation means in said armor wires are spaced from each other and are distributed longitudinally of said cable.

3. An armored submarine cable as claimed in claim 2, wherein each of said sections of anticorrosive metal wires is from about 300 to about 600 meters long.

4. An armored submarine cable as claimed in claim 2, wherein the nearest electric insulation means of two of said armor wires are spaced from each other by at least 2 meters longitudinally of said cable.

5. An armored submarine cable as claimed in claim 1, wherein:
each of said anticorrosive metal wires comprises an underlying metal wire and a coating of an electrically insulating material on said underlying metal wire; and
each of said electric insulation means comprises a pair of short metal wires that are substantial extensions of two adjacent underlying metal wires and have respective engagement means at the ends thereof, an insulator member having engagement means at the ends thereof which engage respective engagement means of said short metal wires, metal tube means at least partially surrounding said engagement means of said underlying metal wire and insulator member and reinforcing the engagement therebetween, and a coating integral with said coating of insulating material on said metal wires of the two adjacent anticorrosive metal wires and providing an outside surface of said electric insulation means.

6. An armored submarine cable as claimed in claim 5, wherein:
said engagement means at the ends of said insulator member respectively comprise oppositely directed screw threads; and
said engagement means at the ends of said short metal wires comprise screw threads engaging with said oppositely directed screw threads of said insulator members.

7. An armored submarine cable as claimed in claim 5, wherein:
each of said short metal wires comprises a tapered portion ending at said engagement means at the end of said short metal wire; and
said electric insulation means further comprises respective masses of a resilient electrically insulating material around said tapered portions and beneath said electric insulation coating.

8. An armored submarine cable as claimed in claim 5, wherein:
each of said short metal wires includes a first portion which is a substantial extension of one of said underlying metal wires, a second portion which includes said engagement means and which has a polygonal cross section, and a third portion having a diameter smaller than the maximum diameter of said second portion and smaller than the diameter of said first portion, said third portion being between said first and second portions; and
said electric insulation means further comprises a layer of an electrically insulating material on said insulator member and on the second portions of said short metal wires, said metal tube means being placed on said layer of electrically insulating material and crimped to said second portions together with said layer.

9. An armored submarine cable as claimed in claim 8, wherein said electric insulation means further comprises respective masses of a resilient electrically insulating material around said second portions and beneath said electric insulation coating.

10. An armored submarine cable as claimed in claim 9, wherein said masses of resilient electrically insulating material are integral with said electric insulation coating.

11. An armored submarine cable as claimed in claim 5, wherein said metal tube means completely surrounds said insulator member.

12. An armored submarine cable as claimed in claim 5, wherein said metal tube means is crimped around said insulator member.

13. An armored submarine cable as claimed in claim 1, wherein said electric insulation means in said armor wires are spaced from each other and are distributed substantially circumferentially and longitudinally of said cable.

* * * * *